United States Patent [19]

Wascat

[11] 4,359,624
[45] Nov. 16, 1982

[54] WELDING APPARATUS WITH AUTOMATIC FOLLOWING OF THE JOINT TO BE WELDED

[75] Inventor: Raymond Wascat, Cuffies by Soissons, France

[73] Assignee: Bignier Schmid-Laurent, France

[21] Appl. No.: 240,503

[22] Filed: Mar. 4, 1981

[30] Foreign Application Priority Data

Mar. 18, 1980 [FR] France ................ 80 06028

[51] Int. Cl.³ ............................................. B23K 9/12
[52] U.S. Cl. ............................... 219/124.34; 318/577
[58] Field of Search .................... 219/124.34, 124.22, 219/125.12; 318/574, 576, 577

[56] References Cited

U.S. PATENT DOCUMENTS

3,757,125 9/1973 Okada et al. ................ 219/124.34
4,215,299 7/1980 Edwin et al. ................ 219/124.34

Primary Examiner—C. C. Shaw
Attorney, Agent, or Firm—Thomas J. Greer, Jr.

[57] ABSTRACT

The invention concerns an automatic welding apparatus for plates. A regular reciprocatory scan is carried out by an optical sensor 18 of the joint 32 between two plates 28 and 30 to be welded: the sensor 18 moves transversely of the general direction of the joint to be welded which moves past under the welding torch 10 and under the sensor 18; the time interval between the instant when the joint is sensed and the instant when the sensor passes the axis of the torch is measured and the torch is moved transversely, by means of a motor 15, in response to the measurement of the time interval, in a direction corresponding to a reduction in this interval, so as to recenter the torch on the joint 32 to be welded. This arrangement avoids drift and possible disengagement from the joint which can occur in welding processes with continuous following of the joint.

8 Claims, 6 Drawing Figures

FIG_1

FIG_2

FIG_3

FIG_6

WELDING APPARATUS WITH AUTOMATIC FOLLOWING OF THE JOINT TO BE WELDED

BACKGROUND OF THE INVENTION

1. Field of the Invention

The present invention concerns an automatic apparatus for carrying out the operation of welding two plate edges together by moving a welding torch along the joint separating the plate parts to be welded, or conversely by moving the plates with respect to a welding torch.

To carry out the welding operation properly, it is necessary for the axis of the welding torch to follow accurately the joint to be welded, but this joint is not necessarily perfectly straight and therefore monitoring of the position of the torch with respect to the joint has to be carried out continuously so that this position can be altered whenever necessary.

A practical example of the necessity for monitoring the position of the welding torch with respect to the joint to be welded is the case of welding edge-to-edge two cylinder elements required to be joined by welding into one single taller cylinder: tank elements are welded side by side in this way, and the welding operation is carried out with a torch which remains at a substantially fixed station while the cylindrical plates turn in front of it as welding proceeds; if the joint between the plates does not remain completely in a plane which contains the axis of the welding torch, it is necessary to move this slightly when the joint moves out of this plane.

In other instances, instead of the plates moving under the welding torch, the torch moves in the direction of the length of the joint to be welded; exactly the same problem arises and if the joint moves out of a line or a plane containing the axis of the welding torch, the torch again has to be moved laterally with respect to the joint.

2. Prior Art

The prior technique currently used to achieve this following of the joint during welding consists in providing for the torch to be mounted on a transverse slide along which it is able to move. In present day boilermaking, the torch is moved manually but this becomes a tricky operation if the precision or speed of welding has to be increased.

In plasma welding processes, guiding precision has to be very high and manual guiding by an operator is excluded in practice. Automatic guiding has consequently already been proposed, by means of a mechanical feeler which stays in permanent contact with the joint, the joint then following the lateral movements of the mechanical feeler. This is possible in cases where the edges of plates in contact are bevelled and where the joint to be welded therefore forms a sort of groove which can be easily followed by the mechanical feeler (in the form of a conical or spherical point, for example). It is also usable when the two plates to be welded overlap, the feeler being able to rest against the edge of the upper plate. It can also be used when the plates are perpendicular. However, even in these instances, use of a mechanical feeler is only satisfactory if the edges of the plates are completely regular and do not have too many faults.

In any event, in the case of unbevelled plates, and particularly whenever the plates are thin and welded edge to edge, guiding by mechanical feeler is certainly not possible.

Automatic guiding methods can therefore by envisaged which used devices for sensing the position of the joint working without contact with the joint, for example, optical sensing devices. The applicant found, by trying the replacement of mechanical feelers with such optical sensing devices, and by maintaining the principle according to which the welding torch follows the displacements of the sensing device which itself follows the joint to be welded, that very precise and, most importantly, reliable guiding was not achieved, in view of the risks of drift within the servo-control and also the risks of disengaging the servo-controls in the case of irregularity in the joint to be welded, or even merely because of the difficulty in servo-optically tracking a line which has poor or irregular contrast.

OBJECTS OF THE INVENTION

An object of the present invention is therefore to provide welding apparatus with automatic positioning which has none of the disadvantages noted in the prior technique, i.e. which is essentially capable of following a joint rapidly and accurately, minimising the risks of drift and disengagement between the sensing device and joint it has to follow.

SUMMARY OF THE INVENTION

To achieve this, the present invention proposes to avoid using a sensing device which follows the joint continuously by developing an all-or-nothing correction signal when there is a difference between the position of the torch and the position of the joint at any instant during the welding operation.

By means of the apparatus with automatic positioning according to the invention, regular alternating scanning is carried out with an optical joint-sensor fixed on a carriage mounted to slide on the torch, in front of this, and movable in a direction transverse to the general direction of the joint to be welded; thus, the optical sensor regularly crosses the joint and as a result supplies an output pulse at the moment it crosses; another sensor (or possibly the same one) supplies another pulse which marks the moment when the joint sensor passes the axis of the torch (the carriage moving in an alternating scan so that the joint sensor oscillates around a central position corresponding to the welding axis of the torch); the time intervals between the two pulses give an indication of the difference existing at the moment this measurement is taken between the actual position of the joint and the position of the torch; this deviation and its direction are measured and the displacement of the torch transversely of the direction of the joint is controlled as a result, by means of motors, so as to lead to reduction in the deviation; in principle, there will simply be a displacment of the torch which is proportional to the time interval measured, the proportionality coefficient being adjustable as a function of the convergence required for correction of the position of the torch with respect to the joint.

It can be noted that a relative deviation of the joint to be welded with respect to the torch rather than with respect to a fixed reference independent of the movable torch is measured, and that this relativity especially allows drift errors to be avoided which can accumulate during the welding operation.

It will also be noted that measurement of the deviation of the torch with respect to the joint is carried out once only per scanning cycle of the movable carriage bearing the optical sensor, and this characteristic allows the risk of the sensor becoming disengaged with respect to the joint to be completely avoided; in fact, by definition, the sensor is not permanently engaged with the joint but follows a path which regularly crosses the joint which is consequently reliably returned to on each scan.

The welding apparatus according to the invention therefore has at least one transverse slide for guiding the torch and one or more driving motors to displace the torch laterally on the slide with respect to the general direction of the joint. Another slide is provided, the latter fixed on the torch, to allow a movable carriage to be also guided in a direction transverse to the general direction of the joint to be welded; the carriage is driven with a regular alternating movement and bears a means for optically sensing the joint, capable of supplying an electrical pulse when it passes above the joint; a means of sensing the central position is provided to supply a pulse when the sensing means passes the axis of the torch; this means for sensing the central position can be borne on the carriage or can be solid with the torch itself. A measuring circuit is provided to develop an algebraic measurement of the difference in time between the pulses supplied by the two sensing means at each scanning cycle carried out by the movable carriage, and a control circuit receives the data from the measuring circuit for acting on the driving motor or motors of the torch so as to reduce the deviation between the torch and the joint to be welded, this deviation being measured by the difference in time between the pulses.

Arrangements are made for the measuring circuit to develop a measurement during an outward journey of the movable carriage and record this measurement, and for the control circuit to act during the return journey of the carriage as a function of the measurement previously recorded. This particularly allows account to be taken of the fact that the optical sensing means is positioned in front of the welding torch and that it consequently does not detect the deviation between the welding point and the joint exactly, but a deviation slightly ahead of the welding point. If correction of the position is not carried out until the carriage has returned, this difference can be compensated for by adjusting the scanning speed of the carriage so that the delay in correcting the position corresponds exactly to the length of time apportioned for the plate to move forward between the optical sensing means in front of the welding torch and the welding torch itself.

The measuring circuit has a circuit for sensing the direction of displacement between the pulses supplied by the two sensing means, this sensing circuit acting in the driving direction of the motor or motors for driving the torch laterally. The measuring circuit also includes a counter receiving high-frequency pulses from a clock and counting the number of high-frequency pulses emitted between the occurrence of pulses supplied by the sensing means. The contents of the counter represent a measurement of the required difference in time.

Provision is preferably made for the control circuit to include another counter also receiving high-frequency pulses and a comparator for comparing the counts of the two counters, with a set of logic gates receiving the signal from the comparator and that from the direction-sensing circuit so as to allow application of a current to a motor for driving the torch laterally during the return journey of the carriage if the contents of the counters are not identical.

Preferably, also, the other counter receives pulses from a clock other than the first, at an adjustable frequency which allows damping and convergence of the position servo-control thus achieved.

The operation and resetting to zero of the motor control circuit and operation and resetting to zero of the measuring circuit are triggered by end-of-travel switches positioned at each end of the journey of the movable carriage.

To avoid joint-sensing errors being translated into an error in positioning of the torch, provision is made to prevent over-large pulses from being emitted by the optical sensing means and also to prevent multiple pulses from issuing from the optical sensing means and appearing during one scan. In these instances, the position of the welding torch is not changed, until the carriage has made a further scan and taken a further measurement.

THE DRAWINGS

Other characteristics and advantages of the invention will become apparent from reading the following detailed description, given by way of example with reference to the drawings in which.

Figure 1:
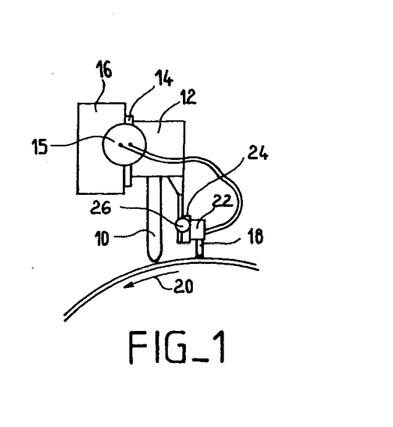
FIG. 1 represents diagrammatically a side view of a welding apparatus according to the invention.

FIG. 1 shows a welding torch 10 which can be a conventional welding torch or a plasma welding torch, and which is fixed to the underside of a movable carriage 12 carried on a slide 14 which is itself fixed to a general frame 16 of the welding machine.

The slide 14 is a motorised slide, i.e. at least one motor 15 is capable of effecting displacement of the carriage 12 along the slide 14; the direction of this displacement is a direction transverse to the general direction of the joint to be welded so that, by operating the motor 15, the welding end of the torch 10 can be exactly positioned opposite the joint between the plates to be welded.

The apparatus shown in FIG. 1 is especially suitable for welding of cylindrical rings of the same diameter side by side, and in this instance, the cylindrical rings positioned edge-to-edge turn under the welding apparatus as the welding operation proceeds. The apparatus can also be used for welding flat plates also positioned edge-to-edge and passing under the welding torch 10, the plates always remaining so disposed that the joint between the edges to be welded always remains under the torch.

FIG. 1 shows a cylindrical tank with two ring elements requiring to be welded.

Details of the slide 14 need not be described here. Such motorized slides are in fact well known in the technique of welding large pieces. Further, the capability of the slide 14 to carry out a displacement of the carriage 12 and the welding torch 10 in the direction of the plates to be welded, i.e. perpendicularly to the surface of these plates, need not be described in detail. In fact, displacement in this direction is always necessary and can be achieved either by the same slide with another driving motor for driving it in the perpendicular direction to the plates or by merely providing for the frame 16 represented to be itself movable in the perpendicular direction to the plates. The invention is only concerned with the presence of a slide 14 capable of displacing the torch 10 in the direction parallel to the plates and transverse to the direction in which the joint to be welded moves.

In addition, means can of course be provided to move the welding torch 10 above the plates rather than having the plates move past under the torch. These two possibilities are exact equivalents.

As FIG. 1 shows also, below the carriage 12, an optical sensor 18 is fixed, capable of distinguishing the presence of the joint to be welded under it, by means, for example, of the contrast in luminance in the light reflected by the joint itself and the flat plate around it.

The optical sensor 18 is positioned upstream of the tip of the welding torch 10, in the direction of movement of the plate, represented by the arrow 20, so that, if the sensor 18, at a give moment, distinguishes the presence of part of the joint below it, this will always be slightly before this part of the joint passes under the torch.

The sensor 18 is, more precisely, fixed to a movable carriage 22 borne on a slide 24 solid with the carriage 12. The carriage 22 is driven, by means of a motor 26, with an alternating movement in a direction parallel to the surface of the plate below the sensor and perpendicular to the general direction of movement of the joint to be welded; the carriage 22 is therefore driven with an alternating movement in the same direction as that in which the welding torch 10 can be displaced by means of the slide 14 and the sensing signals from the sensor 18 will in fact be used to control the motor 15 for driving the carriage 12 along the slide 14.

As will be explained later, the movement of the carriage 22 and hence of the sensor 18 is a regular alternating scanning movement over a small distance (of the order of 1 or several centimeters), the scanning distance being chosen to be just sufficient to cover the whole surface over which the joint to be welded is able to move as a consequence of fluctuations in the linearity of its movement.

In contrast, the slide 14 can cover a considerably greater extent, thereby allowing a significant displacement of the carriage 12 if required, to allow, for example, initial positioning of the torch at stations which can vary according to the welding operations to be carried out. However, this facility is not essential if other means are provided to achieve this initial positioning.

Figure 2:
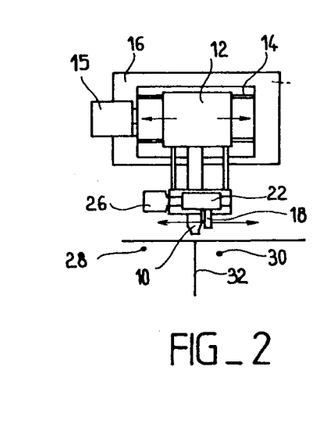
FIG. 2 represents a front view corresponding to FIG. 1.

FIGS. 2 and 3 again show respectively from the front and from above the torch 10 borne by the support carriage 12, the transverse slide 14, the corresponding driving motor 15, the frame 16, the optical sensor 18 mounted on its movable carriage 22 and driven through a regular alternating movement by the motor 26, and lastly two plates 28 and 30 connected edge to edge along a joint 32 to be welded, the plates moving past in the direction of the arrows 20 which is also the direction of the joint 32 to be welded.

Figure 3:
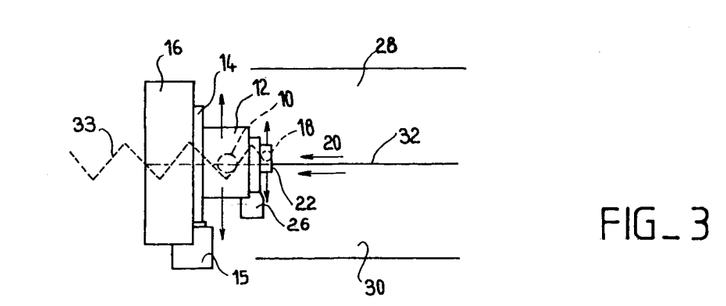
FIG. 3 represent s view from above corresponding to FIGS. 1 and 2.

In FIG. 3, the drawing of the relative path of the sensor 18 with respect to the plates 28 and 30 is again represented by a dotted line with the reference 33; this path is triangular since the sensor 18 is driven through a regular alternating scanning movement and the plates move past at a constant speed under the sensor.

As can be seen, the sensor regularly crosses the path of the joint to be welded and supplies a pulse each time. A further sensor is also provided, cooperating with the carriage 22 and capable of supplying a pulse each time the sensor 18 passes the axis of the torch 10. This sensor can be a movable sensor borne by the carriage and cooperating with a member fixed with respect to the support carriage 12. This can also be a fixed sensor cooperating with a part solid with the carriage 12. This second sensor can be optical but need not be; it can be, in particular, constituted by the sensor 18 itself in some instances, as long as it can supply a pulse which is distinct from the pulse supplied when it passes over the joint to be welded. In what follows, the second sensor will be termed reference sensing device because it issues a signal each time the sensor 18 passes a reference position which is on the axis of the torch 10 (axis taken in the direction of movement of the joints to be welded).

Figure 4:
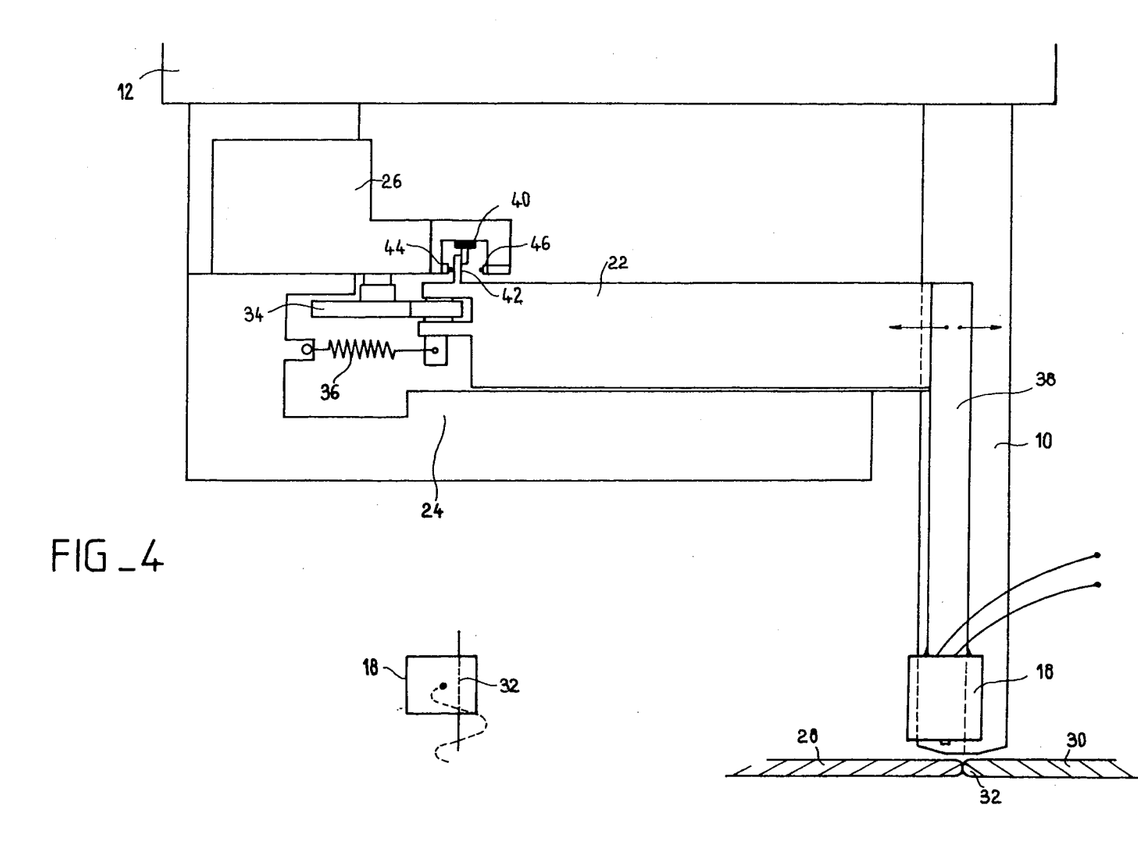
FIG. 4 represents an example of a movable carriage driven with an alternating movement and bearing an optical joint sensor.

An example of a movable carriage bearing a joint sensor is represented in FIG. 4. The support carriage bearing the welding torch is again designated by the reference 12.

Below this support carriage 12 and in front of the welding torch 10, a motorized slide 24 is fixed, extending parallel to the direction of the plates 28 and 30 to be welded and perpendicularly in the direction of the joint 32 to be welded. This slide bears the movable carriage 22 which makes a regular alternating movement as a result of being driven by means of a motor 26 acting on a cam 34 and by means of a return spring 36 on the carriage which brings the latter back towards the left of the figure whenever the cam is not pushing the carriage back towards the right. The cam 34 is so designed that the rotary movement imparted by the motor 26 changes into a regular alternating movement of the carriage.

At one end, the carriage bears a vertical support arm 38 extending downwards in the direction of the plates to be welded and which itself bears at its end the optical sensor 18 which is therefore immediately opposite the plate and oscillates about the joint 32.

The reference sensing device mentioned above, which determines the moment when the sensor 18 passes the axis of the torch 10, appears in the diagram with the reference 40 which represents a member borne by the support carriage 16 and cooperating with a spur 42 solid with the carriage 22 so as to issue a signal when the spur 42 passes in front of the member 40.

Two additional sensing devices, respectively 44 and 46, are also provided, which can also cooperate with the spur 42 and which issue respectively a signal indicating that the carriage is at the beginning of its outward journey (sensor 44) and at the beginning of its return journey (sensor 46). These sensors can be end-of-travel microswitches.

The sensors 44 and 46 for the beginning of outward and return scanning serve in the initiation of different stages of the electrical processing of signals from the sensors 18 and 40, particularly for carrying out monitoring of the position of the welding torch 10 at each scan by the carriage 12, and also for resolving this processing into a measuring position stage during the outward journey of the scan by the carriage, and a stage of repositioning the torch 10 during the return journey of the scan by the carriage. The sensors 40, 44 and 46 which only give data relating to the position of the carriage with respect to the fixed points of the torch support carriage can equally well be mounted on the carriage or even cooperate with the cam 34 or other parts connected to the carriage driving motor.

The processing circuits controlling repositioning of the torch at every instant as a function of the data from the joint sensor cell 18 will now be described with reference to FIG. 5.

This cell supplies pulses whenever it passes above the joint. The reference sensor 40 also supplies pulses whenever the cell 18 passes the axis of the torch 10, i.e. in practice whenever the carriage 22 is in the middle of travel. A circuit 48 receives these pulses and develops an interval signal with a duration corresponding to the interval between the pulses from these two sensors 18 and 40, and a circuit 50 also receives these pulses and produces a signal at its output indicating the order of occurrence of the pulses. It will be noted that the circuits 48 and 50 only work in this way during the outward journey of the scan by the carriage so that there is no ambiguity in the direction of displacement to be given the torch, once the order of occurrence of the pulses from the sensors 18 and 40 has been determined. The direction-sensing circuit in particular is reset to zero at the beginning of each outward scan by the sensor, by means of the end-of-travel sensing device 44 mentioned, in reference to FIG. 4.

The interval signal produced by the circuit 48 during the interval between the pulses serves to enable the counting input of a counter 52 which receives high-frequency pulses from a clock 54 after having also been reset to zero at the beginning of the outward journey of the carriage.

At the end of the interval signal, counting is stopped and the contents of the counter remain stored; they represent a number corresponding to the interval between pulses. The sensing device 46 (FIG. 4) for the end of the outward journey of the carriage supplies a pulse which is stored in a circuit 56 for the whole return journey of the scan so as to open an AND gate 58 and allow counting, in a counter 60, of high-frequency pulses from a clock 62 with adjustable frequency. The counter 60, reset to zero at the beginning of the outward scan, counts until its contents are identical to those of the counter 52. A comparator 64 detects this identity and then stops the counting of the counter 60 by closing the AND gate 58, one input of which is connected to the output of the comparator 64.

Through a storage bistable 66 and a logic circuit 68, the output of the comparator 64 controls application of current to the motor or motors 15 for driving the torch 10, in a direction determined by the circuit 50 for sensing the order of pulses. A motor is then driven and drives the torch from the beginning of the return scan by the carriage, as long as the contents of the counters 52 and 60 are not identical. When the counter 60 reaches the contents of the counter 52, the comparator changes state, and the bistable 66 also changes state and stops the counting at the same time it stops the motors.

The logic circuit 68 which, more precisely, controls the application of current to the motor only allows this application during the return scan by the carriage and receives the output of the storage device 56 connected to the end-of-travel sensing device 46 for this.

The logic circuit 68 also only allows this application of current if a single joint-sensing pulse has been emitted during the outward journey of the scan, and only if the pulse has a sufficiently small width. A circuit 70 for sensing multiple pulses and a circuit 72 for detecting over large pulses then receive signals from the joint sensor 18 and inhibit the logic circuit 68 in the other instances.

The whole advantage of these two circuits is that they prevent the torch from taking up a position as a function of the sensing of something other than a joint to be welded, for example as a function of scratches on the plate or other faults such as too great a joint-width at a given point.

An alarm circuit 74 can also be provided which is capable of issuing a visible or audible alarm signal if, during several successive journeys of the scanning carriage, multiple pulses or over-large pulses are sensed, as a succession of such faults is probably the sign of a major fault in the welding operation, this fault having to be corrected before the operation continues. A counter 76 is therefore provided to record the number of successive times faults are detected. This counter 76 is reset to zero by the occurrence of normal signals for allowing working of the motor 15, these signals appearing at the output of the logic circuit 68.

The working of the repositioning system according to the invention carried out at each scanning cycle of the carriage will have been understood from what precedes. At the beginning of scanning, the sensing device 44 supplies a pulse which initializes the whole system and which, in particular, resets the counters 52 and 62 to zero as well as the bistable 66 at the output of the comparator 64 so that the logic circuit 68 is ready to give a working instruction to the motor 15, but it will only do this when it receives an enabling instruction for this from the end-of-travel sensor 46 indicating that the outward scan is finished and the return scan is beginning.

At the beginning of the outward scan, the counters 52 and 60 remain at zero and the counter 60 also remains at zero throughout the duration of the outward scan.

The counter 52 starts to count from the beginning of the occurrence of the pulse from the joint sensor 18 or the pulse from the reference sensor 40 and it stops only on the occurrence of the beginning of the pulse from the other sensor. The contents of the counter are then representative of the interval between the two pulses and are not dependent on the order of these pulses since this order is sensed by the sensor 50 which stores the order for the whole outward and return scanning journey of the carriage.

If an over large pulse is sensed from the joint sensor, the logic circuit 68 is inhibited throughout the rest of the outward and return scanning journey of the carriage. Similarly, if multiple pulses are sensed by the circuit 70, the logic circuit is inhibited for the whole of the rest of the outward and return journey of the carriage. In these two instances, the motor 15 will not be started on the return of the carriage.

When the carriage reaches the end of its outward journey, sensed by the end-of-travel sensing device 46, the logic circuit 68 normally allows application of a current to the motor, with a direction determined by the direction-sensing circuit 50.

The counter 60 simultaneously starts to count at a frequency determined by the adjustable clock 62, and these two operations, advancing the motor and counting by the counter 60, proceed until the comparator 64 indicates that the counter 60 has reached the contents of the counter 52. The comparator 64 then makes the bistable 66 set and acts on the logic circuit to stop the motor for driving the torch and on the AND gate 58 to stop the counter 60 counting.

It will thus be understood that the torch is advanced by an amount proportional to its deviation relative to the joint, in a direction which corresponds of course to a reduction of this deviation. The proportionality coefficient is determined by the speed of advance of the motors and by the adjustable frequency of the clock 62; this frequency can be relatively high if very rapid repositioning of the torch is essential, and lower if slower but more convergent repositioning, without the risk of overloading or hunting of the servo-control, is essential.

After the motor has been stopped by the logic circuit, the state of the circuit does not change and nothing more occurs until the unit is initialized again when the carriage arrives at the end of its return travel and begins a new scan.

The rate at which data is picked up from the joint to be welded is a function of both the scanning frequency and the welding speed (speed of movement of the plate).

There is therefore complete freedom in the choice of scanning frequency as long as the times for outward and return scans are compatible with proper working of the processing unit.

For example, a welding speed of the order of 1 cm/s and a scanning frequency with one outward and return journey per second will give a datum for the position of the joint for each centimeter covered. The scanning frequency can either be increased or reduced to increase or reduce the number of data signals per centimeter covered, depending on the type of assembly to be carried out (theoretical straight line or possibly theoretical curved line).

Care must be taken to minimize the displacement between the data source (sensing device) and the torch.

Figure 5:
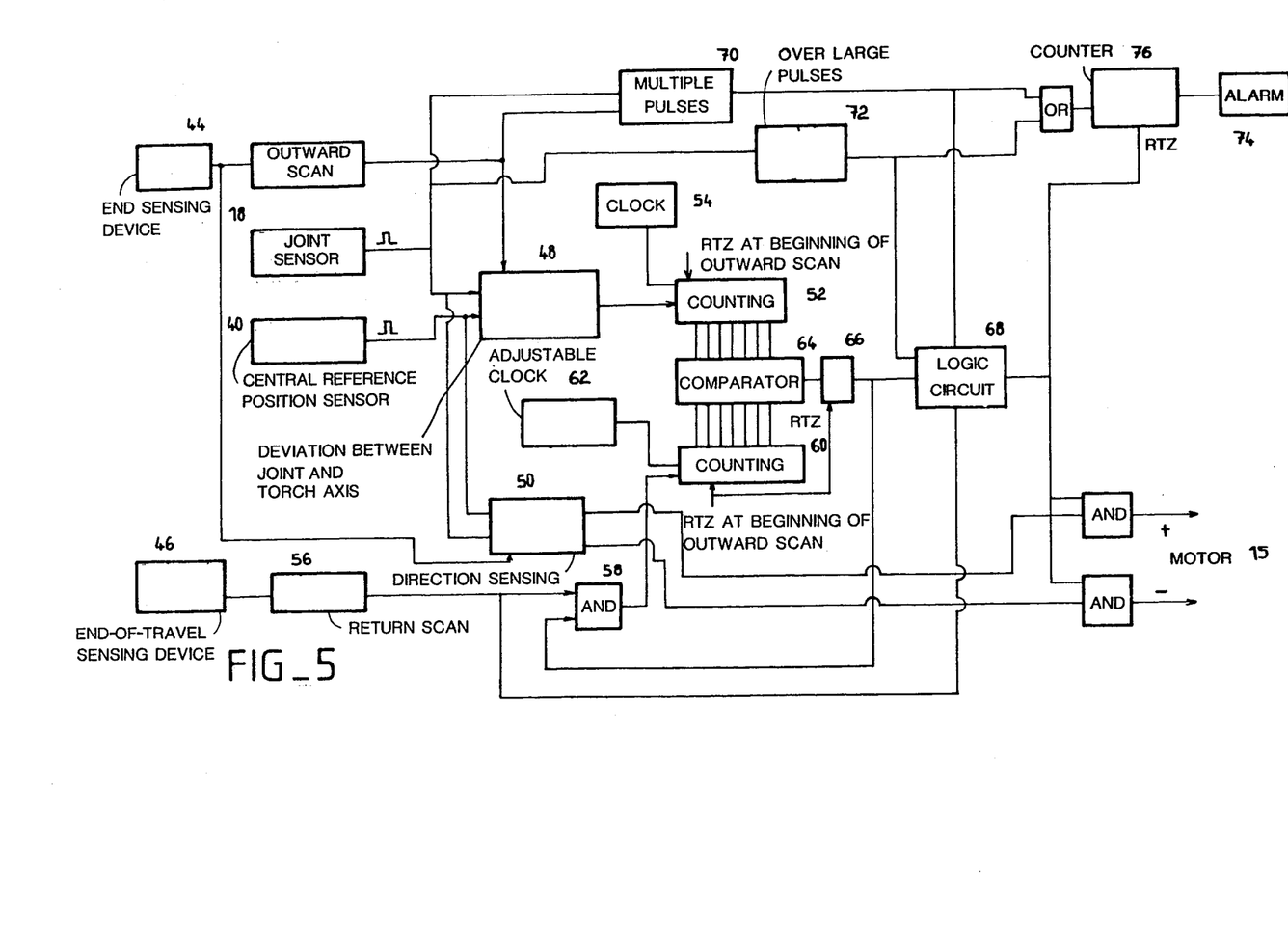
FIG. 5 represents a block diagram of the circuits for controlling the welding torch as a function of the data from the optical joint sensor in particular.

The arrangement represented in FIG. 5 has two counters 52 and 60 and a comparator 64 which senses that their contents are equal. This arrangement could of course be replaced by an equivalent arrangement which would simply have a single up-down counter with an up counting input originating from the circuit 48 and a down counting input originating from the circuit 58 with different clocks for the up and down counting, and with a decoder at the output of the up-down counter to detect passage through zero by the contents of the counter; this decoder controls the logic circuit 68.

Figure 6:
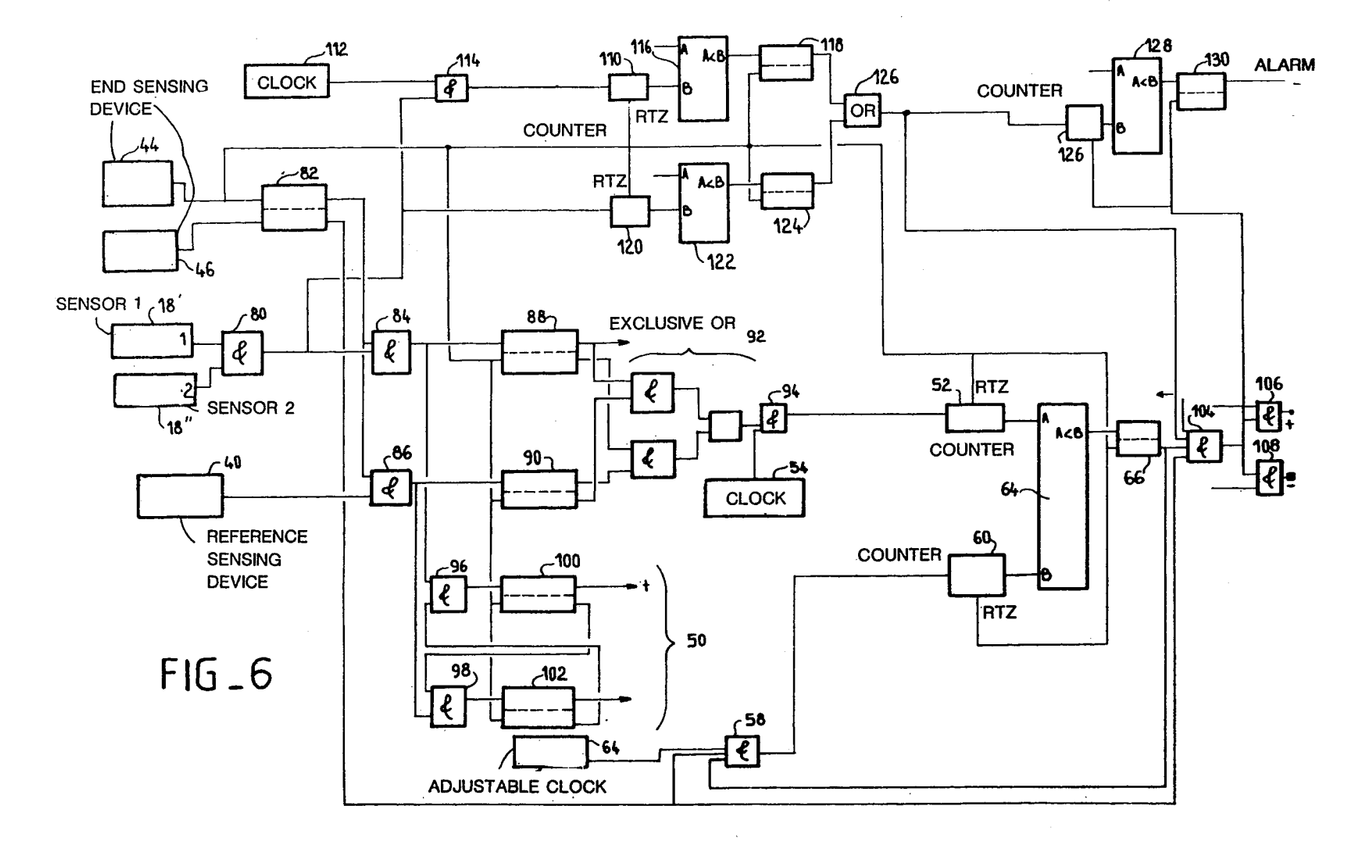
FIG. 6 represents a detailed electrical logic diagram of the circuits for controlling the positioning of the welding torch according to the invention.

Lastly, FIG. 6 represents a detailed circuit corresponding to the diagram of FIG. 5 and capable of carrying out all the functions indicated in the preceding description.

The sensor 18 is actually constituted here by two optical sensors 18' and 18", positioned one behind the other in alignment with the torch, with an AND gate 80 functioning as coincidence circuit and only allowing an output pulse to be delivered if the two sensors 18' and 18" pass over the joint simultaneously. The output pulse from the circuit 18 is a pulse which corresponds to the common portion of the pulses from the individual sensors 18' and 18". Pinpoint faults in the edges of the plates to be welded are thus eliminated.

Switches constituting the end sensing device 44 and the end sensing device 46 are both connected to the inputs of a bistable 82 forming a store, this bistable having two outputs at complementary logic levels, one defining the time of the outward scan by the carriage and the other defining the time of the return scan. The bistable 82 changes state each time it is actuated by one of the sensing devices 44 and 46.

The circuit for developing an interval signal which starts when the pulse from the joint sensor 18 appears and finishes when the pulse from the reference sensing device 40 appears has two AND gates 84 and 86, each with an input connected to the output of the bistable 82 and a further input connected respectively to the sensor 18 and the sensor 40, the AND gates 84 and 86 being present to ensure that measuring only occurs during the outward journey of the movable carriage.

The outputs of the AND gates 84 and 86 are connected on the one hand to the bistables 88 and 90 respectively acting as storage devices, and on the other hand to the direction-sensing circuit 50. The output of the bistables 88 and 90 is connected to a set of logic gates for developing the required interval signal. These logic gates actually form an exclusive OR circuit 92.

The output of the exclusive OR circuit 92 is connected to an input of an AND gate 94, whose other input receives signals from the clock 54, and whose output is coupled to the counting input of the counter 52 which therefore counts at the frequency of the clock 54 for the whole duration of the interval signal produced between the occurrence of the pulse from the joint sensor and the pulse from the reference sensing device 40.

The direction sensor 50 has two AND gates 96 and 98 connected in a loop with one another respectively by the bistables 100 and 102, the loop connection being such that the bistables are interlocked in a first stage if the first pulse appears at the input of the AND gate 96 and in a second state if the first pulse appears at the input of the AND gate 98.

The other counter 60 receives pulses from the adjustable clock 62 via the AND gate 54 which receives at a first input the output from the adjustable clock, at a second input an output from the bistable 82 indicating that the carriage is on its return journey, and has a third input connected to the output bistable 66 of the comparator 64 and indicating that the contents of the counter 60 have not yet reached the contents of the counter 52.

As can be seen, the output of the bistable 66 is connected to an input of an AND gate 104, a second input of which is connected to an output of the bistable 82 to allow opening of the gate 104 during the return journey only of the carriage; the AND gate 104 has a third input connected to the circuits for sensing multiple and over large pulses to prevent opening of the gate 104 when an over large pulse or several pulses have been sensed during the outward journey of the carriage. A fourth input can also be provided for the gate 104, this input being connected to the output of the bistable 88 (which is triggered by a joint-sensing pulse occurring) so that the motor-control circuit remains off if no joint-sensing pulse appears during the outward journey of the scan by the carriage.

The output of the gate 104 is connected to an input of a first AND gate 106 and to an input of a second AND gate 108 whose other inputs are connected to two outputs of the direction-sensing circuit so that, when the gate 104 allows a signal through, either the gate 106 or the gate 108 itself supplies a control signal to the motor according to the state of the circuit 50 for sensing the order of occurrence of pulses.

The outputs of the gates 106 and 108 can each be connected to a relay causing supply of the motor for driving the torch in one direction or the other respectively.

The circuit for sensing over large pulses essentially comprises a counter 110 which receives pulses from a clock 112 which can actually be the clock 54, through an AND gate 114 which only opens for the duration of the pulse from the sensor 18. The counter 110 therefore counts throughout the whole duration of this pulse and its contents are compared in a comparator 116 with a fixed value. The output of the comparator 116 causes a bistable 118 to set when the contents of the counter 110 exceed the threshold. Resetting to zero of the counter 110 and the bistable 118 is carried out by the end sensing device 44 at the beginning of each outward journey of the carriage. Through the input of the gate 104, the output of the bistable 118 stops the supply to the motor for driving the torch.

The circuit for sensing multiple pulses during an outward journey of the carriage is constituted by a counter 120 which receives the pulses from the joint sensor 18 directly, the contents of the counter 120 being compared in a comparator 122 with a fixed number (2, for example), and the comparator 122 causes a bistable 124 to set if this number is exceeded. The output of the bistable 124 also serves to close the gate 104 and therefore to stop the supply to the motor for driving the torch. For example, an OR circuit 126 can be provided with its inputs respectively connected to the bistable 118 and the bistable 124 and its output connected to the gate 104 to prevent the motor from working in the case of multiple pulses or in the case of over large pulses. The counter 120 and the bistable 124 are also reset to zero only at the beginning of the outward journey of the movable carriage.

Lastly, an alarm circuit is provided, with a counter 128 connected to the output of the OR gate 126 to count the number of successive times a fault is observed (over large pulse or multiple pulses) and to compare this number with a predetermined number in a comparator 128. In this instance, the output of the comparator 128 causes a bistable 130 to set which causes an alarm. The bistable 130 and the counter 126 can be reset to zero by the output of the gate 104, i.e. when the circuit operates normally once, the successive faults counter 126 is reset to zero and only in the event of several successive faults being recorded is an alarm given.

I claim:

1. Welding apparatus for welding a joint between two plates, said apparatus comprising a frame, at least one transverse guide carried by the frame, a welding torch mounted for movement along the guide transversely of the joint, drive means for adjusting the position of the torch along the guide, a further guide, said further guide being fixed on the torch, a carriage mounted on said further guide for movement therealong with respect to the torch transversely of the general direction of the joint to be welded, further driving means for regularly reciprocating the carriage along said further guide, optical sensor means for optically sensing said joint, said optical sensing means being carried by said carriage and being arranged to supply an electrical pulse each time said optical sensor means passes over the joint, reference sensor means for sensing a central reference position to thereby supply a pulse when the optical sensor means passes the axis of the torch, a measuring circuit for developing an algebraic measurement of the difference in time between the said pulses in each reciprocation cycle of the movable carriage, and a control circuit connected to the measuring circuit and arranged to actuate the torch-driving motor in a sense which leads to a reduction in said difference in time.

2. The apparatus of claim 1, in which said measuring circuit includes a circuit for sensing the direction of the displacement between said two pulses from the optical sensor means and the reference sensor means, and a counter is connected to receive clock pulses from a clock and is arranged to count said clock pulses during the time interval between the ocurrence of pulses supplied by the sensing means, the contents of the counter representing a measurement of the said time displacement.

3. The apparatus of claim 2, in which said control circuit comprises a further counter also receiving clock pulses, a comparator to compare the counts of the two counters and a set of logic gates for receiving the signal from the comparator and that from the direction-sensing circuit to allow application of a current to the motor for driving the torch laterally during the return journey of the carriage as long as the contents of the counter are not identical.

4. The apparatus of claim 3, in which the said further counter receives clock pulses from a second clock, and the frequency of the pulses from said further clock is adjustable to regulate the convergence of the approach of the torch to the joint to be welded.

5. The apparatus of claim 2, and including means for sensing the outward end and the return end of the travel of the movable carriage and for thereby triggering the operation and resetting to zero of the motor control circuit, and the operation and resetting to zero of the measuring circuit.

6. The apparatus of claim 1, and including means for sensing the width of the output pulse coming from said optical joint sensor and means for preventing the motor from being actuated by the control circuit if the pulse is of a greater width than an adjustable predetermined threshold.

7. The apparatus of claim 1, and including a counter for counting the number of pulses emitted by the joint sensor during an outward journey of the movable carriage, and means for preventing the control circuit from being actuated if the number of pulses exceeds a predetermined number.

8. The apparatus of claim 6 or claim 7, and including a counter to count the number of successive journeys of the carriage during which actuation of the control circuit of the carriage has been prevented, and to emit an alarm signal when said number exceeds a predetermined value.

* * * * *